United States Patent
Nordbruch et al.

(10) Patent No.: US 10,467,904 B2
(45) Date of Patent: Nov. 5, 2019

(54) METHOD AND DEVICE FOR OPERATING A VEHICLE

(71) Applicant: Robert Bosch GmbH, Stuttgart (DE)

(72) Inventors: Stefan Nordbruch, Kornwestheim (DE); Stefan Hoffmann, Bietigheim (DE)

(73) Assignee: Robert Bosch GmbH, Stuttgart (DE)

(*) Notice: Subject to any disclaimer, the term of this patent is extended or adjusted under 35 U.S.C. 154(b) by 259 days.

(21) Appl. No.: 15/517,810

(22) PCT Filed: Sep. 29, 2015

(86) PCT No.: PCT/EP2015/072326
§ 371 (c)(1),
(2) Date: Apr. 7, 2017

(87) PCT Pub. No.: WO2016/066351
PCT Pub. Date: May 6, 2016

(65) Prior Publication Data
US 2017/0309183 A1    Oct. 26, 2017

(30) Foreign Application Priority Data
Oct. 27, 2014 (DE) .......... 10 2014 221 755

(51) Int. Cl.
*G08G 1/16* (2006.01)
*B62D 15/02* (2006.01)
*G05D 1/00* (2006.01)
*G05D 1/02* (2006.01)

(52) U.S. Cl.
CPC .......... *G08G 1/168* (2013.01); *B62D 15/027* (2013.01); *B62D 15/0285* (2013.01); *G05D 1/0038* (2013.01); *G05D 1/0212* (2013.01)

(58) Field of Classification Search
CPC .. G08G 1/168; B62D 15/027; B62D 15/0285; G05D 1/0038; G05D 1/0212
See application file for complete search history.

(56) References Cited

U.S. PATENT DOCUMENTS 6,104,314 A * 8/2000 Jiang ............... B60Q 9/004
340/436
9,523,984 B1 * 12/2016 Herbach .......... B62D 15/025
9,581,997 B1 * 2/2017 Penilla ............ G05D 1/0011
(Continued)

FOREIGN PATENT DOCUMENTS

CN    103718223 A    4/2014
DE    102011079703 A1    1/2013
(Continued)

OTHER PUBLICATIONS

International Search Report dated Feb. 8, 2016, of the corresponding International Application PCT/EP2015/072326 filed Sep. 29, 2015.

*Primary Examiner* — Sze-Hon Kong
(74) *Attorney, Agent, or Firm* — Norton Rose Fulbright US LLP; Gerard Messina

(57) ABSTRACT

A method for operating a vehicle, the vehicle being guided in a parking facility by remote control in such a way that a predetermined minimum distance to mobile objects in the surroundings of the vehicle is maintained. A device for operating a vehicle, a parking facility system for vehicles, and a computer program are also described.

14 Claims, 2 Drawing Sheets

(56) References Cited

U.S. PATENT DOCUMENTS

| | | | | |
|---|---|---|---|---|
| 9,809,196 B1* | 11/2017 | Penilla | ............... | H04N 7/181 |
| 2004/0036601 A1* | 2/2004 | Obradovich | ............ | B60C 23/0408 |
| | | | | 340/540 |
| 2005/0085984 A1* | 4/2005 | Uhler | ............ | B60K 31/0008 |
| | | | | 701/70 |
| 2007/0198190 A1 | 8/2007 | Bauer et al. | | |
| 2010/0156672 A1* | 6/2010 | Yoo | ............... | G08G 1/14 |
| | | | | 340/932.2 |
| 2012/0053807 A1* | 3/2012 | Salinger | ............ | B60W 30/143 |
| | | | | 701/93 |
| 2012/0139715 A1* | 6/2012 | Yamazato | ............ | B60Q 9/008 |
| | | | | 340/436 |
| 2012/0188100 A1* | 7/2012 | Min | ............... | G08G 1/143 |
| | | | | 340/932.2 |
| 2012/0284209 A1* | 11/2012 | Duffy | ............... | G07B 15/02 |
| | | | | 705/418 |
| 2012/0323643 A1* | 12/2012 | Volz | ............... | G07B 15/02 |
| | | | | 705/13 |
| 2013/0060421 A1* | 3/2013 | Kadowaki | ............ | B62D 15/027 |
| | | | | 701/36 |
| 2013/0184925 A1* | 7/2013 | Niemz | ............... | B60W 30/09 |
| | | | | 701/25 |
| 2014/0046506 A1* | 2/2014 | Reichel | ............... | B62D 15/0285 |
| | | | | 701/2 |
| 2014/0074330 A1* | 3/2014 | Malone | ............... | B60W 10/06 |
| | | | | 701/22 |
| 2014/0172221 A1* | 6/2014 | Solyom | ............... | B62D 15/0285 |
| | | | | 701/23 |
| 2014/0176348 A1* | 6/2014 | Acker, Jr. | ............... | G08G 1/144 |
| | | | | 340/932.2 |
| 2014/0197939 A1 | 7/2014 | Stefan et al. | | |
| 2014/0324310 A1* | 10/2014 | Kobayashi | ............ | B62D 15/0285 |
| | | | | 701/70 |
| 2015/0077273 A1* | 3/2015 | Alshinnawi | ............ | G08G 1/096783 |
| | | | | 340/928 |
| 2015/0286219 A1* | 10/2015 | Reichel | ............... | G08G 1/0965 |
| | | | | 701/23 |
| 2015/0353080 A1* | 12/2015 | Mukaiyama | ............ | E05B 77/54 |
| 2015/0367845 A1* | 12/2015 | Sannodo | ............... | B60W 30/06 |
| | | | | 701/23 |
| 2016/0071415 A1* | 3/2016 | Maeda | ............... | G06K 9/00812 |
| | | | | 348/148 |
| 2017/0212511 A1* | 7/2017 | Paiva Ferreira | ....... | G06Q 10/08 |
| 2017/0227967 A1* | 8/2017 | Bariant | ............... | B62D 15/0285 |
| 2018/0194343 A1* | 7/2018 | Lorenz | ............... | G05D 1/0282 |

FOREIGN PATENT DOCUMENTS

| | | |
|---|---|---|
| DE | 102012203235 A1 | 9/2013 |
| DE | 102012017497 B3 | 12/2013 |
| DE | 102012015922 A1 | 2/2014 |
| DE | 102013200491 A1 | 7/2014 |
| JP | 2007295033 A | 11/2007 |

\* cited by examiner

METHOD AND DEVICE FOR OPERATING A VEHICLE

FIELD

The present invention relates to a method and a device for operating a vehicle. The present invention furthermore relates to a parking facility system for vehicles and a computer program.

BACKGROUND INFORMATION

In fully automated (autonomous) so-called valet parking, a vehicle is stopped by its driver at a drop-off point, for example, in front of a parking garage, and from there the vehicle itself drives into a parking position/parking space and back to the drop-off point again.

There are a variety of challenges in such an automatic parking process, for example:

In mixed operation (simultaneous operation of autonomously driving vehicles and non-autonomously driving vehicles, i.e., manually guided vehicles), situations may occur in which the vehicles (autonomously driving vehicles and vehicles having a human driver) have to come to an agreement. In the normal case, this is carried out between human drivers, for example, via hand signals.

Furthermore, the individual vehicle sensors or the infrastructure may have deficiencies in accuracy or robustness. This means, in the event of (close) approaches or driving past, a risk of collisions could exist.

SUMMARY

An object of the present invention may be therefore to provide a method for operating a vehicle, which reduces or even avoids a risk of collisions in mixed operation of autonomously and non-autonomously driving vehicles in a parking facility.

An object of the present invention may also be to provide a corresponding device for operating a vehicle.

An object of the present invention may be to provide a corresponding parking facility system for vehicles.

Furthermore, an object of the present invention may be to provide a corresponding computer program.

According to one aspect of the present invention, a method for operating a vehicle is provided, the vehicle being guided in a parking facility by remote control in such a way that a predetermined minimum distance to mobile objects in the surroundings of the vehicle is maintained.

According to another aspect, a device is provided for operating a vehicle, including a remote control for the remote-controlled guidance of the vehicle in such a way that a predetermined minimum distance of the vehicle to mobile objects in the surroundings of the vehicle may be maintained.

According to one aspect, a parking facility system for vehicles is provided, including a parking facility and the device according to the present invention.

According to another aspect, a computer program is provided, which includes program code for carrying out the method according to the present invention when the computer program is executed on a computer.

According to one aspect, a vehicle is provided, which includes a guiding unit for autonomously guiding the vehicle and a communication interface, the communication interface being designed to receive remote control signals via a communication network, the guiding unit being designed to guide the vehicle autonomously in response to the remote control signals.

The present invention, thus, includes in particular guiding the vehicle by remote control in a parking facility in such a way that a predetermined minimum distance to mobile objects in the surroundings of the vehicle is always maintained. Because a predetermined minimum distance is always maintained, a risk of collision is thus advantageously reduced or even avoided entirely. A mixed operation of autonomously driving and non-autonomously driving vehicles in the parking facility is therefore advantageously enabled. In particular, a deficiency in an accuracy with respect to a surroundings sensor system of vehicles or with respect to an infrastructure may thus advantageously be compensated for.

The vehicles are, thus, prevented from coming excessively close. This is carried out in particular in that the predetermined minimum distance is maintained.

A parking facility within the meaning of the present invention may also be referred to as a parking area and is used as a parking lot for vehicles. The parking facility therefore forms in particular a contiguous area, which has multiple parking spaces (in the case of a parking facility on private property) or parking zones (in the case of a parking facility on public property). According to one specific embodiment, the parking facility may include a parking deck. In particular, the parking facility includes a parking garage.

Parking zones or parking spaces may also be referred to hereafter as parking positions. A parking position within the meaning of the present invention is a position at which the vehicle is to park autonomously or by remote control. This means, according to one specific embodiment, it is provided that the vehicle parks autonomously at the parking position or is parked by remote control at the parking position. This means, the vehicle is guided by remote control in such a way that it parks at the parking position.

A drop-off position, which may also be referred to as a drop-off point, within the meaning of the present invention is a position at which a driver of the vehicle may stop his/her vehicle for an autonomous or remote-controlled parking process and may pick up his/her vehicle again therefrom at a later point in time. This means in particular that the vehicle stopped at the drop-off position is guided by remote control in the parking facility in such a way that it drives from the drop-off position to a parking position and parks therein in particular. The parking position at which the vehicle is to park may be ascertained as explained hereafter, for example.

According to another specific embodiment it is provided that the vehicle pulls autonomously out of the parking position or is guided by remote control in such a way that it pulls out of the parking position.

In another specific embodiment it is provided that the vehicle is driven back autonomously from the parking position to the drop-off position or is guided by remote control in such a way that it drives from the parking position back to the drop-off position.

Autonomous within the meaning of the present invention means in particular that the vehicle navigates or drives autonomously, i.e., without an intervention by a driver. The vehicle thus drives autonomously, in particular navigates autonomously, in the parking facility, without a driver having to steer the vehicle for this purpose or having to be located therein. This means in particular that the vehicle includes, for example, a guiding unit for the navigation of the vehicle, which is designed to guide the vehicle autonomously.

Guiding within the meaning of the present invention includes in particular a transverse and/or a longitudinal guidance of the vehicle.

Such an autonomously driving vehicle, which may automatically pull into and out of a parking space, is referred to, for example, as an AVP vehicle. AVP stands for "automated valet parking" and may be called an "automated parking process". Vehicles which do not have this AVP functionality are referred to, for example, as normal or manual vehicles.

According to one specific embodiment it is provided that the remote control is carried out via a communication network. This means in particular that remote control commands are transmitted to the vehicle via a communication network.

In one specific embodiment, the communication network includes a WLAN network and/or a mobile network.

According to one specific embodiment it is provided that a communication which is carried out via the communication network is encrypted. This means in particular that commands, signals, data which are transmitted via the communication network, for example, between a vehicle and a device, in particular a parking garage system, are encrypted. Eavesdropping on the communication on the part of unauthorized parties is thus in particular advantageously prevented or at least made more difficult.

In another specific embodiment it is provided that to maintain the predetermined minimum distance, the vehicle is guided into one of multiple parking positions of the parking facility. This means in particular that the vehicle is guided by remote control into one of multiple parking positions of the parking facility to maintain the predetermined minimum distance. In particular, it is provided that the vehicle is stopped, i.e., in particular parked, at this parking position, into which it was guided. Because the vehicle is guided into one of multiple parking positions, it is advantageously removed from the driving or flowing traffic. This means in particular that it is no longer an active participant in the driving or flowing traffic. In the parking position, the vehicle is advantageously located outside the lanes of the parking facility. It therefore advantageously no longer represents an obstruction to other vehicles which are driving in the parking facility. It may thus be ensured simply and effectively that the predetermined minimum distance may be maintained.

According to another specific embodiment, it is provided that the parking position is ascertained as a function of a parameter. This yields the technical advantage in particular that the ascertainment of which of the multiple parking positions the vehicle is guided into may be adapted to various situations on the basis of the parameterization. A more flexible concept is thus provided, to provide the predetermined minimum distance with the aid of the guidance of the vehicle into a parking position.

In another specific embodiment it is provided that the parking position is ascertained as a function of multiple parameters.

In another specific embodiment it is provided that the parameter describes an instantaneous and/or anticipated traffic situation in the parking facility. This yields the technical advantage in particular that the specific existing traffic situation and/or the anticipated traffic situation in the parking facility is taken into consideration when ascertaining the parking position. A flexible and adapted guidance of the vehicle is therefore enabled.

According to another specific embodiment it is provided that, when the instantaneous and/or anticipated traffic situation includes an absence of oncoming traffic and a following vehicle, the vehicle is guided into that parking position which, in relation to its instantaneous position, is provided most remotely in the parking facility.

Because the vehicle is guided to the most remote parking position, this thus yields the technical advantage in particular that it is stopped as far away as possible from the following vehicle. A correspondingly large distance is thus effectuated between the two vehicles.

In another specific embodiment it is provided that, when the instantaneous and/or anticipated traffic situation includes a presence of oncoming traffic and an absence of a following vehicle, the vehicle is guided into that parking position which, in relation to its instantaneous position, is provided nearest in the parking facility.

This yields the technical advantage in particular that the vehicle moves preferably rapidly out of a lane. This takes place in particular because it is guided to the nearest parking position.

According to another specific embodiment it is provided that, when the instantaneous and/or anticipated traffic situation includes a presence of oncoming traffic and a presence of a following vehicle, the vehicle is guided into that parking position which, in relation to its instantaneous position, is provided nearest in the parking facility.

This also yields the technical advantage in particular that the vehicle is removed preferably rapidly out of a lane. This takes place in particular because the vehicle is guided to the nearest parking position.

In another specific embodiment it is provided that, when the instantaneous and/or anticipated traffic situation includes a preceding vehicle and/or a living being located ahead and an absence of a following vehicle, the vehicle is guided into that parking position which, in relation to its instantaneous position, is provided both nearest in the parking facility and at least one parking position before the parking position of the preceding vehicle and/or a position of a living being located ahead.

This yields the technical advantage in particular that, on the one hand, the vehicle is preferably removed rapidly from a lane, and on the other hand, a safety distance, at least one parking position, is provided between the vehicle and a preceding vehicle, which is to park at its assigned parking position and a position of a living being located ahead.

According to one specific embodiment, multiple living beings are provided, which are in particular formed identically or preferably differently. A living being within the meaning of the present invention is, for example, a person or an animal.

In another specific embodiment it is provided that, when the instantaneous and/or anticipated traffic situation includes a preceding vehicle and/or a living being located ahead and a presence of a following vehicle, the vehicle is guided into that parking position which is provided before a parking position of the preceding vehicle and/or a position of a living being located ahead.

A minimum distance, at least one parking position, is thus provided between the vehicle and a preceding vehicle or a living being located ahead.

Functionalities of the device, in particular the remote control, result from specific embodiments of the method and vice versa. This means in particular that the remote control is configured to carry out the individual method steps as described in conjunction with the specific embodiments of the method, i.e., to guide the vehicle accordingly.

This means in particular that according to one specific embodiment, the device is configured to carry out the method according to the present invention.

According to one specific embodiment, multiple vehicles are provided, at least one of these vehicles or multiple of these vehicles being operated according to the method described here. This means in particular that according to one specific embodiment, a method is provided for operating multiple vehicles, one or multiple vehicles being guided by remote control in the parking facility in such a way that a predetermined minimum distance is maintained to mobile objects in the surroundings of the vehicle.

According to one specific embodiment, a communication interface is provided, which is designed to transmit remote control signals via a communication network to a vehicle. These remote control signals are produced or generated with the aid of the remote control according to another specific embodiment.

The present invention is explained in greater detail below on the basis of preferred exemplary embodiments.

DETAILED DESCRIPTION OF EXAMPLE EMBODIMENTS

Figure 1:
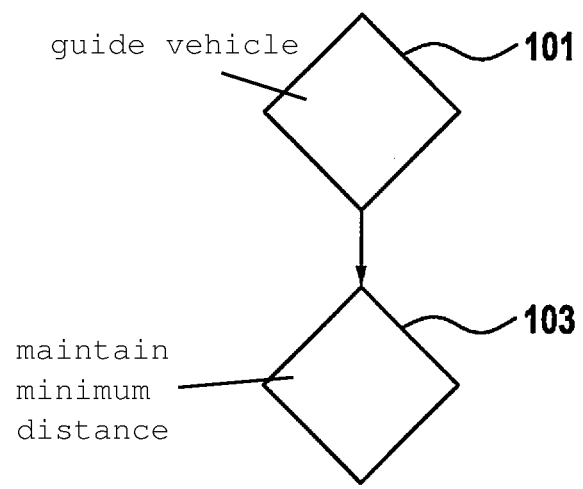
FIG. 1 shows a method for operating a vehicle.

FIG. 1 shows a flow chart of a method for operating a vehicle.

According to a step 101, the vehicle is guided by remote control in a parking facility in such a way that, according to a step 103, a predetermined minimum distance to mobile objects in the surroundings of the vehicle is maintained.

A mobile object within the meaning of the present invention is, for example, a person, i.e., a human, or an animal. A mobile object within the meaning of the present invention is in particular another vehicle. The other vehicle is, for example, an autonomous or manual vehicle. When the singular is used in conjunction with the "mobile object," this should always be read to include the plural and vice versa. Other AVP vehicles may preferably also be remote controlled.

Figure 2:
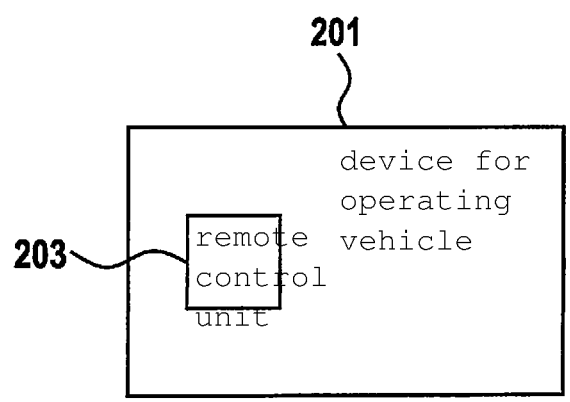
FIG. 2 shows a device for operating a vehicle.

FIG. 2 shows a device 201 for operating a vehicle.

Device 201 includes a remote control 203 for the remote-controlled guidance of the vehicle in such a way that a predetermined minimum distance of the vehicle to mobile objects in the surroundings of the vehicle may be maintained. The remote control may in general be referred to in particular as a remote control unit.

According to one specific embodiment, device 201 includes a communication interface, which is designed to transmit remote control signals to a vehicle via a communication network. These remote control signals are in particular generated or produced with the aid of remote control or remote control unit 203. These remote control signals or remote control commands thus "tell" or command the vehicle how it has to drive so that a predetermined minimum distance of the vehicle to mobile objects in the surroundings of the vehicle may be maintained.

Figure 3:
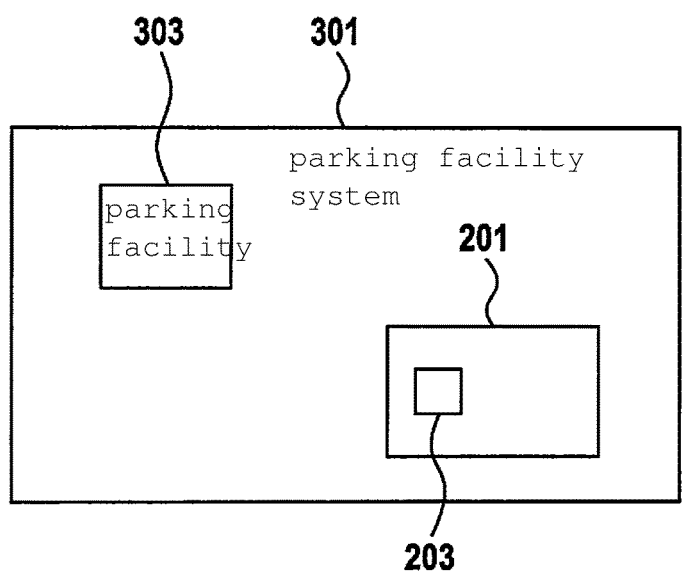
FIG. 3 shows a parking facility system for vehicles.

FIG. 3 shows a parking facility system 301 for vehicles.

Parking facility system 301 includes a parking facility 303, which has multiple parking zones or parking spaces, for example. Parking facility system 301 furthermore includes device 201 of FIG. 2.

The present invention thus in particular includes the concept of providing a method, a device, a parking facility system, and a computer program, with the aid of which in particular in the case of fully automated (autonomous) valet parking, a risk of collisions, and an "encounter" of AVP vehicles with other vehicles (normal or other AVP vehicles) and/or with persons may be reduced or even prevented. According to the present invention, a parking facility management system is provided, implemented here by the device which "controls," i.e., remotely controls the AVP vehicles in such a way that they may drive autonomously having a minimum distance to other vehicles and/or persons, i.e., mobile objects. This minimum distance or predetermined minimum distance is in particular definable.

Remote control within the meaning of the present invention in particular means that with the aid of the remote control, there is monitoring of when the vehicle, in particular the AVP vehicle, starts driving, drives, parks, or stops or pauses or shuts down. This means in particular that a parking facility management system has control over when an AVP vehicle starts driving, drives, pulls into or out of a parking space, stops, pauses, or shuts down. The remote control thus includes one or multiple of the maneuvers mentioned hereafter: starting driving, driving, pulling into and out of a parking space, stopping, pausing, and shutting down.

Furthermore, it is controlled or monitored in particular with the aid of the remote control at which velocities, with and/or on which paths or trajectories the vehicle may or is supposed to drive. The remote control thus in particular includes a control of a vehicle velocity and/or a vehicle trajectory and/or a vehicle deceleration and/or a vehicle acceleration.

Furthermore, the parking position, for example, the parking space, into which the AVP vehicle is supposed to or may drive is controlled or monitored with the aid of the remote control. In this case, the selection and the assignment of the parking position, for example, the parking space for the AVP vehicle is a particularly preferred and reasonable criterion, since it decisively determines traffic or an encounter.

According to specific embodiments which are not shown, for example, at least one or multiple of the following situations may occur, this is in particular with reference to the time which the AVP requires for a procedure of pulling into and/or out of a parking space and/or also for the travel to the parking position and/or to the drop-off position (also called the drop zone):

1. No oncoming traffic (lack or absence of a preceding vehicle) and no following vehicle or no following vehicles or no following AVP vehicle or no following AVP vehicles (i.e., an absence or a lack of a following vehicle).

2. No oncoming traffic and one or multiple following vehicle(s), in particular AVP vehicles.

3. Oncoming traffic (vehicles and/or persons and/or animals) and no following vehicle or no following vehicles or no following AVP vehicle or no following AVP vehicles.

4. Oncoming traffic (vehicles and/or persons and/or animals) and one or multiple following vehicle(s), in particular AVP vehicles.

5. One or multiple preceding vehicles or persons or animals located ahead (this should be read to include singular) and no following vehicles, in particular AVP vehicles.

6. One or multiple preceding vehicle(s) or persons and/or animals and one or multiple following vehicle(s), in particular AVP vehicles.

The above-mentioned situations are thus relevant in particular when ascertaining the driving trajectories for preventing the encounter or for a predefined minimum distance.

The above-mentioned situations preferably always relate to the route or path or trajectory to be traveled by the AVP vehicle.

According to one specific embodiment it is provided that the remote-controlled guidance is carried out as a function of a respective velocity at which the vehicle and the possibly present other vehicles and/or persons and/or animals are moving, the remote-controlled guidance is preferably carried out as a function of tolerances in the respective velocity.

According to another specific embodiment it is provided that the remote-controlled guidance is carried out in such a way that an encounter of the vehicle with oncoming traffic is prevented. Preventing an encounter with oncoming traffic thus has priority in particular, since this oncoming traffic has to be passed. This means in particular that according to one specific embodiment, such an encounter is prevented. In the case of preceding and/or following traffic, stopping is possible, this being provided according to one specific embodiment, whereby a minimum distance may advantageously be achieved.

This means in particular that according to another specific embodiment, the vehicle and/or other vehicles has/have to be stopped. This is in particular because a stop signal is transmitted to the vehicle or vehicles with the aid of the remote control. This is carried out via the communication network, for example. This takes place in particular with the aid of the communication interface.

In one specific embodiment it is provided that, when an encounter of the vehicle with oncoming traffic cannot be prevented, a stop signal is transmitted to the vehicle and/or to the vehicle or vehicles of the oncoming traffic. Thus, according to this specific embodiment, if an encounter cannot be prevented, for example, presumably because the oncoming traffic arrives more rapidly than the parking process is completed, according to this specific embodiment, a stop signal is transmitted for one or multiple of the vehicles. This is carried out, for example, with the aid of the device, i.e., in particular with the aid of the remote control, in particular with the aid of a parking facility management system. Thus, for example, this may advantageously have the effect that at most one vehicle is in motion at one time.

An algorithm of the assignment of a parking position for the vehicle is as follows according to further specific embodiments:

If, according to one specific embodiment, the first above-mentioned situation exists, it is thus unimportant according to one specific embodiment which parking position, for example, parking space, the vehicle is guided into. According to one specific embodiment it is provided that additional criteria may also be taken into consideration for the selection of the parking position.

If, according to one specific embodiment, the second above-mentioned situation exists, the vehicle is thus assigned the most remote parking position.

If, according to another specific embodiment, the third above-mentioned situation exists, the vehicle is thus assigned the nearest parking position.

If, according to another specific embodiment, the above-mentioned fourth situation exists, the vehicle is thus assigned the nearest parking position.

If, according to another specific embodiment, the fifth above-mentioned situation is provided, the vehicle is thus assigned the nearest parking position, but at least one parking position before the parking position of the preceding vehicle or before the anticipated persons.

If, according to one specific embodiment, the sixth above-mentioned situation is provided, the vehicle is thus assigned the parking position before the parking position of the preceding vehicle or before the anticipated persons.

According to one specific embodiment it is provided that the parking facility includes various areas which are delimited from one another and which are designed in particular in such a way that they may be approached separately from one another. There are thus preferably various areas which are delimited from one another in the parking facility, for example, a left parking garage half and a right parking garage half. These various areas which are delimited from one another are designed in such a way that they may be approached separately and at least largely separately (i.e., separately from one another). This advantageously simplifies carrying out the method according to the present invention.

According to another specific embodiment it is provided that the parking facility, in particular the parking garage, has a separate area reserved for fully automated valet parking. It is thus provided according to one specific embodiment that the parking facility includes a separate area reserved for fully automated valet parking. Possible problems due to mixed traffic or due to pedestrians, etc. may thus advantageously be avoided. Carrying out the method is also thereby advantageously further simplified.

According to one specific embodiment it is provided that a presence and a movement of AVP vehicles, in particular normal vehicles, and/or persons are monitored by a parking facility management system which includes a parking garage monitoring system, including, for example, a video camera system.

According to another specific embodiment, the entire process or at least some of the above-mentioned method steps are documented for documentation purposes. This means, according to one specific embodiment, at least some, preferably all of the method steps mentioned above and hereafter are documented for documentation purposes, in particular recorded, in particular recorded with the aid of one or multiple video cameras.

The documenting, in particular the recording, is carried out according to one specific embodiment with the aid of a parking facility monitoring system, in particular a parking garage monitoring system. The parking facility monitoring system includes one or multiple video cameras according to one specific embodiment.

According to one specific embodiment, a parking facility monitoring system is provided for monitoring the parking facility, which is furthermore designed to document, in particular record, at least some, in particular all of the method steps mentioned above and hereafter.

According to one specific embodiment, the commands, i.e., in particular the remote control commands, are transmitted from the parking facility management system to the AVP vehicle or vehicles, for example, via WLAN.

What is claimed is:

1. A method for operating a vehicle, comprising:
  guiding the vehicle in a parking facility by remote control; and
  during the remote-controlled guidance, maintaining a predetermined minimum distance to mobile objects in surroundings of the vehicle, wherein:
    the vehicle is guided into one of multiple parking positions of the parking facility to maintain the predetermined minimum distance,
    the parking position is ascertained as a function of a parameter, the parameter describes at least one of an instantaneous and anticipated traffic situation in the parking facility, and when the at least one of the instantaneous and anticipated traffic situation includes an absence of oncoming traffic and a following vehicle, the vehicle is guided into that parking position which, in relation to its instantaneous position, is most remote in the parking facility.

2. The method as recited in claim 1, wherein, when the at least one of the instantaneous and anticipated traffic situation includes at least one of a preceding vehicle and a living being located ahead and an absence of a following vehicle, the vehicle is guided into that parking position which, in relation to its instantaneous position, is both provided nearest in the parking facility and is located closer to the vehicle than at least one of a parking position of the preceding vehicle and a position of the living being located ahead.

3. The method as recited in claim 1, wherein, when the at least one of the instantaneous and anticipated traffic situation includes at least one of a preceding vehicle and a living being located ahead and a presence of a following vehicle, the vehicle is guided into that parking position which is located closer to the vehicle than at least one of a parking position of the preceding vehicle and a position of the living being located ahead.

4. The method as recited in claim 1, wherein the remote-controlled guidance is carried out in such a way that an encounter of the vehicle with oncoming traffic is prevented.

5. The method as recited in claim 1, wherein, when an encounter of the vehicle with oncoming traffic cannot be prevented, a stop signal is transmitted to at least one of the vehicle and at least one vehicle of the oncoming traffic.

6. The method as recited in claim 1, wherein at least one of the method steps is recorded with the aid of at least one video camera.

7. A method for operating a vehicle, comprising:
guiding the vehicle in a parking facility by remote control; and
during the remote-controlled guidance, maintaining a predetermined minimum distance to mobile objects in surroundings of the vehicle, wherein:
the vehicle is guided into one of multiple parking positions of the parking facility to maintain the predetermined minimum distance,
the parking position is ascertained as a function of a parameter,
the parameter describes at least one of an instantaneous and anticipated traffic situation in the parking facility, and
when the at least one of the instantaneous and anticipated traffic situation includes a presence of oncoming traffic and an absence of a following vehicle, the vehicle is guided into that parking position which, in relation to its instantaneous position, is provided nearest in the parking facility.

8. A method for operating a vehicle, comprising:
guiding the vehicle in a parking facility by remote control; and
during the remote-controlled guidance, maintaining a predetermined minimum distance to mobile objects in surroundings of the vehicle, wherein:
the vehicle is guided into one of multiple parking positions of the parking facility to maintain the predetermined minimum distance,
the parking position is ascertained as a function of a parameter,
the parameter describes at least one of an instantaneous and anticipated traffic situation in the parking facility, and
when the at least one of the instantaneous and anticipated traffic situation includes a presence of oncoming traffic and a presence of a following vehicle, the vehicle is guided into that parking position which, in relation to its instantaneous position, is provided nearest in the parking facility.

9. A device for operating a vehicle, comprising:
a remote control for remote-controlled guidance of the vehicle which remotely controls the vehicle in such a way that a predetermined minimum distance of the vehicle to mobile objects in surroundings of the vehicle are maintained, wherein:
the vehicle is guided into one of multiple parking positions of a parking facility to maintain the predetermined minimum distance,
the parking position is ascertained as a function of a parameter,
the parameter describes at least one of an instantaneous and anticipated traffic situation in the parking facility, and
when the at least one of the instantaneous and anticipated traffic situation includes an absence of oncoming traffic and a following vehicle, the vehicle is guided into that parking position which, in relation to its instantaneous position, is most remote in the parking facility.

10. A parking facility system for vehicles, comprising:
a parking facility; and
a remote control for remote-controlled guidance of the vehicle which remotely controls the vehicle in such a way that a predetermined minimum distance of the vehicle to mobile objects in surroundings of the vehicle are maintained, wherein:
the vehicle is guided into one of multiple parking positions of the parking facility to maintain the predetermined minimum distance,
the parking position is ascertained as a function of a parameter,
the parameter describes at least one of an instantaneous and anticipated traffic situation in the parking facility, and
when the at least one of the instantaneous and anticipated traffic situation includes an absence of oncoming traffic and a following vehicle, the vehicle is guided into that parking position which, in relation to its instantaneous position, is most remote in the parking facility.

11. The parking facility system as recited in claim 10, wherein the parking facility includes various areas delimited from one another, which are designed in particular in such a way that the various areas may be approached separately from one another.

12. The parking facility system as recited in 10, wherein the parking facility includes a separate area reserved for fully automated valet parking.

13. The parking facility system as recited in claim 10, further comprising:
a parking facility monitoring system for monitoring the parking facility, the parking facility monitory system designed to document at least a portion of the remote-controlled guidance of the vehicle.

14. A non-transitory computer-readable storage medium on which is stored a computer program for operating a vehicle, the computer program, when executed by a computer, causing the computer to perform:

guiding the vehicle in a parking facility by remote control; and during the remote-controlled guidance, maintaining a predetermined minimum distance to mobile objects in surroundings of the vehicle, wherein:

the vehicle is guided into one of multiple parking positions of the parking facility to maintain the predetermined minimum distance, the parking position is ascertained as a function of a parameter, the parameter describes at least one of an instantaneous and anticipated traffic situation in the parking facility, and when the at least one of the instantaneous and anticipated traffic situation includes an absence of oncoming traffic and a following vehicle, the vehicle is guided into that parking position which, in relation to its instantaneous position, is most remote in the parking facility.

* * * * *